(12) United States Patent
Madadi et al.

(10) Patent No.: US 12,710,134 B2
(45) Date of Patent: Aug. 18, 2026

(54) GAIN BASE FOR POWER DISTRIBUTION SYSTEMS

(71) Applicant: Marmon Utility LLC, Milford, NH (US)

(72) Inventors: Sai Sowmith Reddy Madadi, Nashua, NH (US); Grant Bonczar, Milford, NH (US); Benjamin Finocchiaro, Milford, NH (US); Guberson Mercedat, Andover, MA (US)

(73) Assignee: Marmon Utility LLC, Milford, NH (US)

( * ) Notice: Subject to any disclaimer, the term of this patent is extended or adjusted under 35 U.S.C. 154(b) by 313 days.

(21) Appl. No.: 18/640,860

(22) Filed: Apr. 19, 2024

(65) Prior Publication Data

US 2024/0353055 A1 Oct. 24, 2024

Related U.S. Application Data

(60) Provisional application No. 63/497,199, filed on Apr. 19, 2023.

(51) Int. Cl.
*H01B 17/16* (2006.01)
*F16M 13/02* (2006.01)

(52) U.S. Cl.
CPC ..... *F16M 13/022* (2013.01); *F16M 2200/024* (2013.01); *H01B 17/16* (2013.01)

(58) Field of Classification Search
CPC ........ H01B 17/16; H01B 17/02; H01B 17/12; F16C 11/045; F16C 11/10
See application file for complete search history.

(56) References Cited

U.S. PATENT DOCUMENTS

| | | | | |
|---|---|---|---|---|
| 3,372,463 | A | 3/1968 | Cheng | |
| 6,227,749 | B1 * | 5/2001 | Fujii | F16C 11/045 174/45 R |
| 6,525,274 | B1 * | 2/2003 | Roberts | H01H 31/023 248/58 |
| 10,134,509 | B1 * | 11/2018 | Pyron | H01B 17/22 |

(Continued)

FOREIGN PATENT DOCUMENTS

| | | | |
|---|---|---|---|
| CA | 926 959 | A | 5/1973 |
| CN | 101 202 429 | B | 6/2011 |
| WO | WO 2024/220832 | A1 | 10/2024 |

OTHER PUBLICATIONS

International Search Report dated Jul. 10, 2024, issued in Int'l. App. PCT/US2024/025452.

*Primary Examiner* — Sherman Ng
(74) *Attorney, Agent, or Firm* — Arnold & Porter Kaye Scholer LLP

(57) ABSTRACT

An apparatus for affixing an insulator to a structure in a power distribution system is disclosed herein. The apparatus may comprise a gain base that enables attachment of an insulator to a utility pole or other structure at multiple angles. In various embodiments, the apparatus may include at least a fixed component configured to be affixed to a structure and a pivoting component configured to rotate with respect to the fixed component to adjust the orientation of the hole via which an insulator is attached to the apparatus. The pivoting component may be configured to receive a threaded insulator pin or other connection device configured to clamp or otherwise affix an insulator to the apparatus.

14 Claims, 15 Drawing Sheets

(56) References Cited

U.S. PATENT DOCUMENTS

| | | | | |
|---|---|---|---|---|
| 2009/0188698 | A1* | 7/2009 | Cloutier | H01B 17/10 174/172 |
| 2011/0233351 | A1 | 9/2011 | Foster | |
| 2015/0030426 | A1* | 1/2015 | Fritel | B66C 1/10 294/174 |
| 2015/0162734 | A1* | 6/2015 | Newman | H01B 17/00 174/5 R |
| 2016/0233010 | A1* | 8/2016 | Hiller | H01B 19/00 |
| 2019/0131777 | A1* | 5/2019 | Schenk | H02G 1/02 |

* cited by examiner

GAIN BASE FOR POWER DISTRIBUTION SYSTEMS

RELATED APPLICATIONS

This application claims priority to U.S. Provisional Patent Application No. 63/497,199, filed Apr. 19, 2023, the content of which is hereby incorporated herein by reference in its entirety.

FIELD OF THE DISCLOSURE

The present invention relates to power distribution systems and, more particularly, to an apparatus for affixing an insulator to a structure in a power distribution system.

BACKGROUND OF THE INVENTION

Utility poles are widely used to mount electrical wire conductors above ground. These conductors are clamped in place via the use of insulators which are attached to the pole using an apparatus, which may comprise or include, for example, pins, brackets, or a gain base. Various types of gain bases for use to affix an insulator to a utility pole or other structure. These conventional gain bases each only enable an insulator to be attached to a utility pole or other structure at one angle. However, to avoid obstructions, increase stability, make insulators or their connection to a utility pole easier to reach, and/or other reasons, it may be desirable or necessary to attach an insulator to a utility pole at a different angle than the single angle enabled by a conventional gain base. As such, there is a need for a gain base that allows an insulator to be mounted at various angles.

SUMMARY OF THE INVENTION

Aspects of this disclosure relate to an apparatus for affixing an insulator to a structure in a power distribution system. The apparatus described herein may comprise a gain base that enables attachment of an insulator to a utility pole or other structure at multiple angles. In various embodiments, the apparatus may include at least a fixed component configured to be affixed to a structure and a pivoting component configured to rotate with respect to the fixed component to adjust the orientation of the hole via which an insulator is attached to the apparatus. In various embodiments, both the fixed component and the pivoting component may each include a set of arms. For example, the set of arms of the fixed component may comprise two arms, and the set of arms of the pivoting component may comprise two or four arms. In various embodiments, each of the arms on the fixed component and the pivoting component may include a curved edge to allow the pivoting component to rotate with respect to the fixed component along the curved edges of the arms of the fixed component. In various embodiments, each of the arms on the fixed component and the pivoting component may include a hole that, when the fixed component and pivoting component are properly aligned, is configured to receive a bolt, which defines a pivoting point about which the pivoting component is configured to rotate with respect to the fixed component. In various embodiments, each of the arms on the fixed component and the pivoting component may also include a set of additional holes that configured to determine an angle at which the pivoting component is secured with respect to the fixed component. For example, once the pivoting component is positioned at a desired angle with respect to the fixed component, and at least one of the set of additional holes on each of the arms of the pivoting component is aligned with at least one of the set of additional holes on each of the arms of the fixed component, the aligned holes are configured to receive a pin configured to secure the pivoting component to the fixed component at the desired angle. In some embodiments, the pin may comprise a clevis pin that is secured within the aligned holes via a cotter pin. In various embodiments, the pivoting component may be configured to receive a threaded insulator pin or other connection device configured to clamp or otherwise affix an insulator to the apparatus (e.g., via a mounting hole on a side of the pivoting component opposite the set of arms).

These and other objects, features, and characteristics of the systems and/or methods disclosed herein, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

These drawings are provided for purposes of illustration only and merely depict typical or example embodiments. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized, and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

Figure 1:
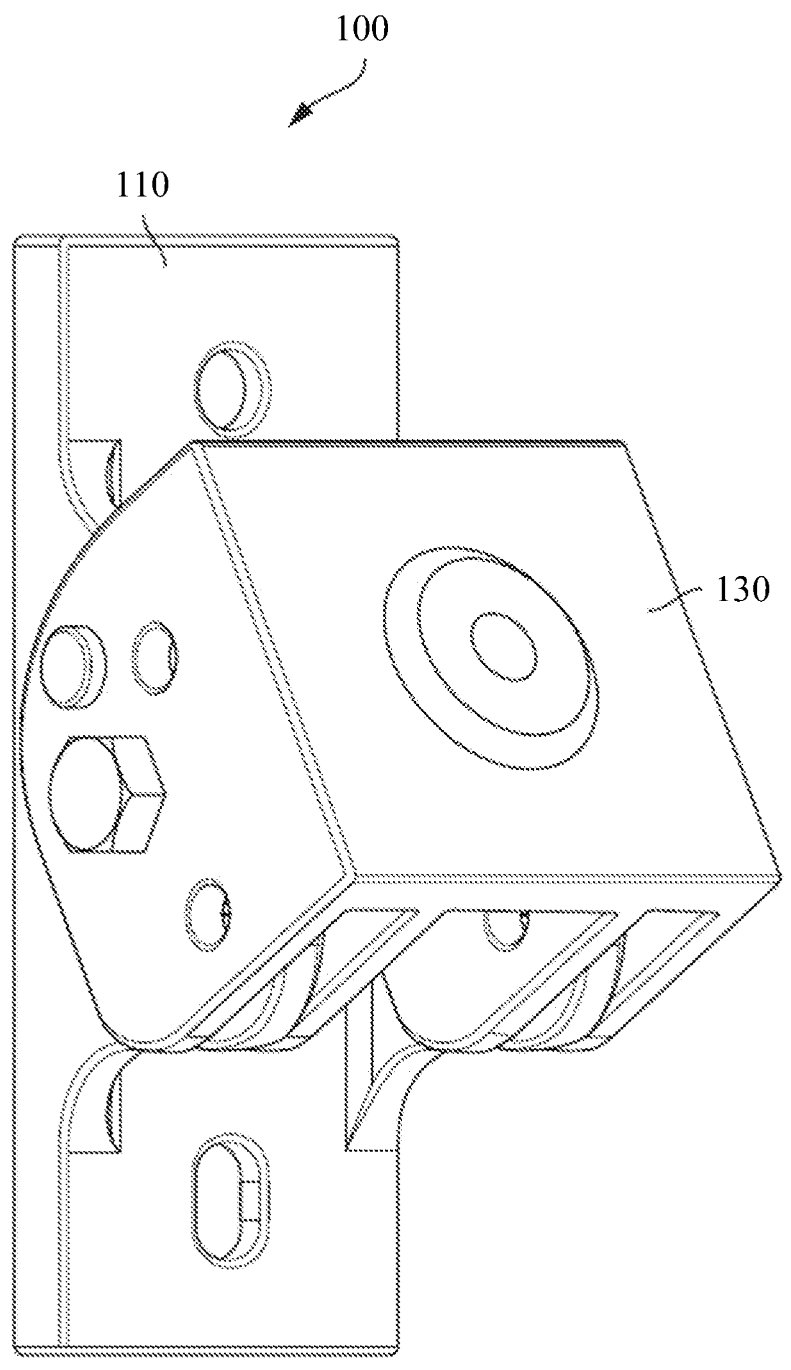
FIG. 1 depicts an example gain base configured to enable attachment of an insulator to a utility pole at varying angles, according to one or more aspects described herein.

The invention described herein relates to an apparatus for a power distribution system. The apparatus described herein may comprise a gain base that enables attachment of an insulator to a utility pole or other structure at multiple angles. As used herein, "gain base" may be used interchangeably with "apparatus" or "mounting device." In various embodiments, the gain base may include at least a fixed component and a pivoting component configured to rotate with respect to the fixed component to adjust the orientation of the hole via which an insulator is attached to the gain base. For example, FIG. 1 depicts a gain base 100 configured to enable attachment of an insulator to a utility pole at varying angles, according to one or more aspects described herein. In various embodiments, gain base 100 comprises a fixed component 110, a pivoting component 130, and/or one or more other components.

Figure 2A:
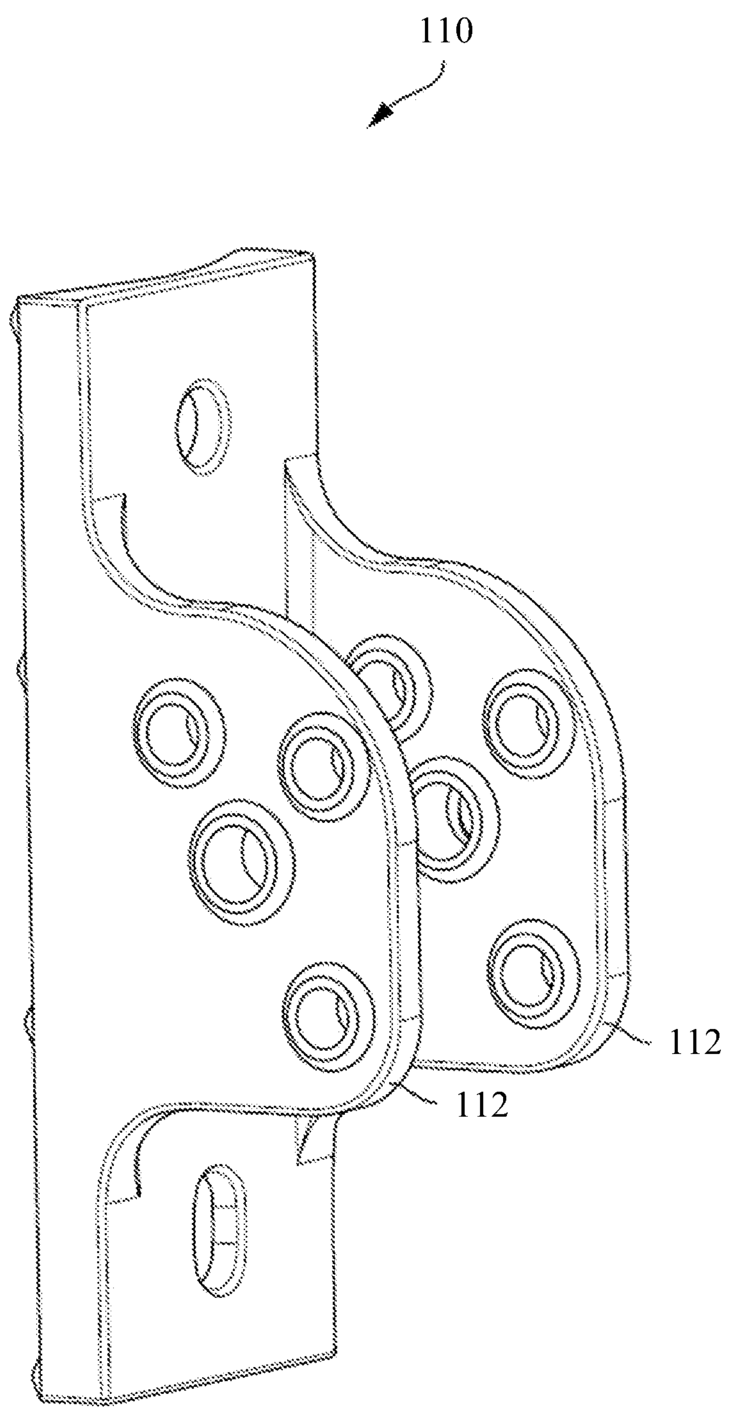
FIGS. 2A-C depict an example fixed component of a gain base configured to enable attachment of an insulator to a utility pole at varying angles, according to one or more aspects described herein.
Figure 2B:
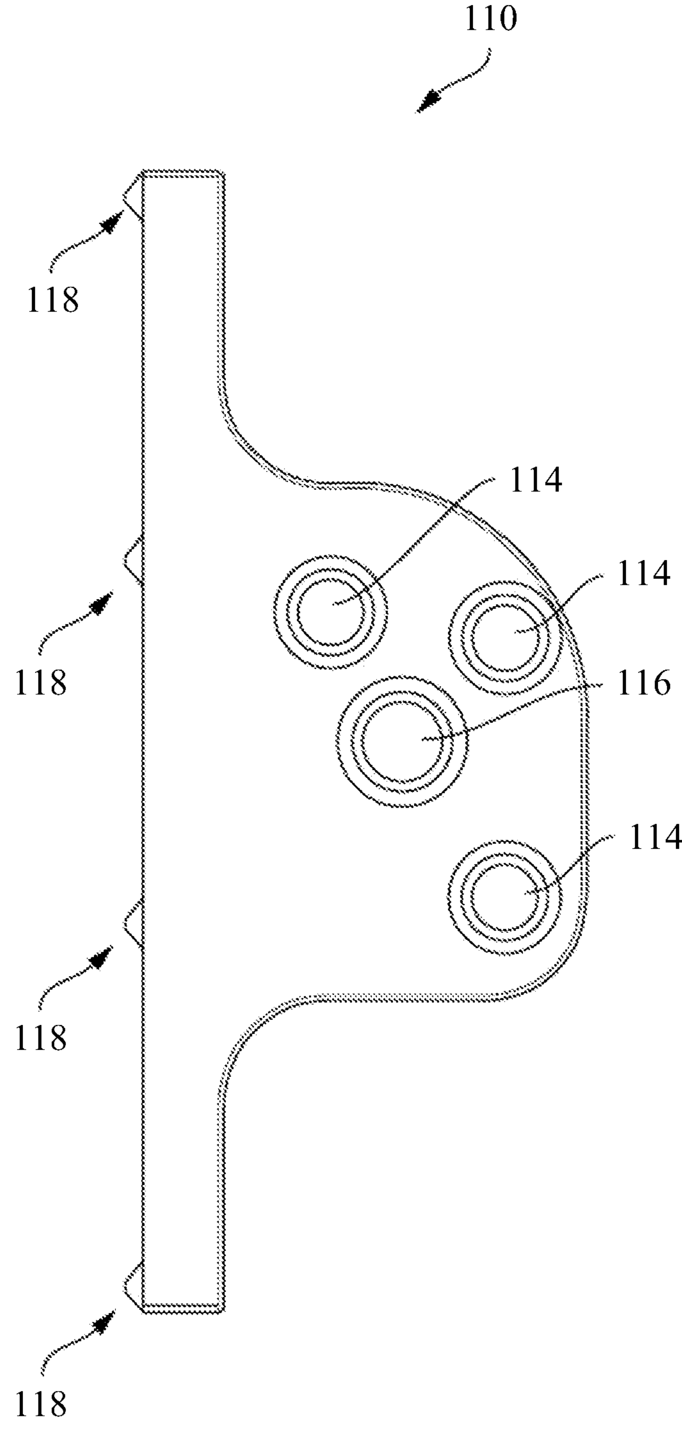
Figure 2C:
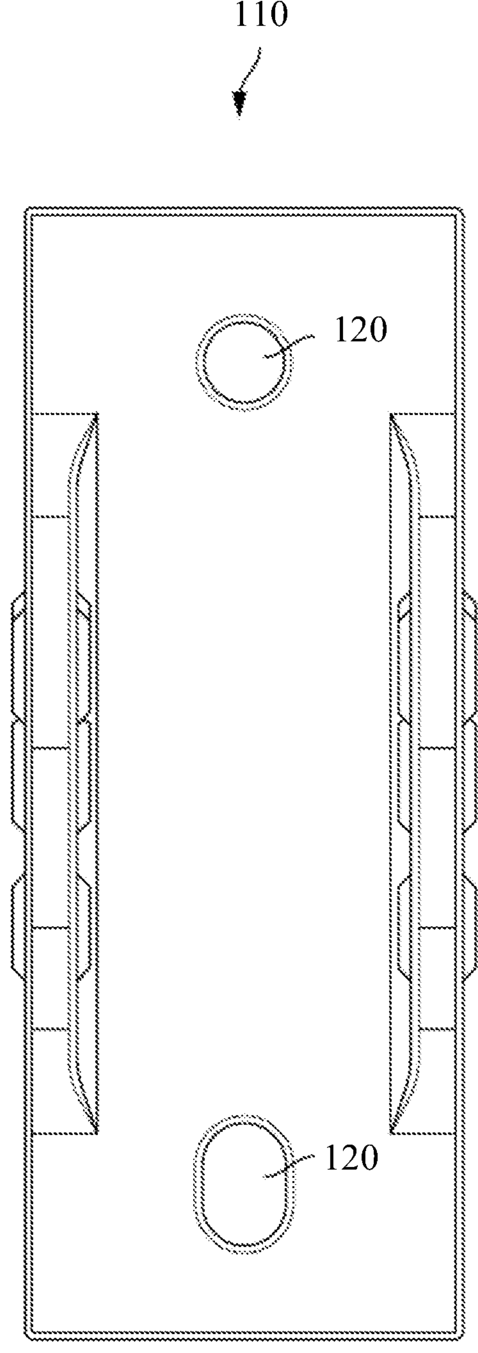

FIGS. 2A-C depict various views of fixed component 110 of gain base 100, according to one or more aspects described herein. For example, FIG. 2A depicts a perspective view of fixed component 110, FIG. 2B depicts a side view of fixed component 110, and FIG. 2C depicts a front view of fixed component 110. In various embodiments, fixed component 110 may be configured to be affixed to a structure. For example, fixed component 110 may be configured to be removably affixed to a utility pole or other structure. In various embodiments, fixed component 110 may comprise curved arms 112 with a set of holes. For example, fixed component 110 may include a pair of curved arms 112. In other embodiments, however, a different number of cured arms 112 may be included on fixed component 110 while remaining consistent with the spirit of this disclosure. In various implementations, the curved arms 112 may each include one or more holes 114 and a hole 116. In some embodiments, the one or more holes 114 and the hole 116 may be extended and/or chamfered to increase the surface area of which stresses are developed. For example, in some embodiments, at least one of one or more holes 114 or hole 116 may be defined by a chamfered edge (or include a chamfered ring) extending away from a side of the curved arm 112 in which the hole is located. In various embodiments, the one or more holes 114 are used to select the angles to be mounted, and hole 116 is used as a pivot point which matches hole 136 on arms 132 of pivoting component 130. In various embodiments, curved arms 112 allow pivoting component 130 to freely curve/rotate over the bottom of curved arms 112. In various embodiments, fixed component 110 includes one or more teeth 118 extending from a side opposite a side from which curved arms 112 extend. In some implementations, teeth 118 may be configured to more rigidly secure fixed component 110 to a structure (e.g., a utility pole) by interfacing with a surface of the structure. For example, teeth 118 may be configured to increase the gripping force by penetrating into a utility pole upon which gain base 100 is installed. In various embodiments, a gap between the interior sides of curved arms 112 may be wide enough to receive the internal arms 132 of pivoting component 130, as described further herein. In various embodiments, the thickness of curved arms 112 is substantially similar to but smaller than the width of smaller gap 148 between the internal arms and external arms of pivoting component 130 to enable curved arms 112 to fit between the internal arms and external arms of pivoting component 130. In various embodiments, fixed component 110 includes one or more holes 120 via which fixed component 110 may be affixed to a utility pole or other structure. For example, one or more holes 120 may be configured to receive a bolt, screw, and/or other component configured to affix fixed component 110 to a utility pole or other structure. In some embodiments, one or more holes 120 may include at least two holes with one or more holes larger than others to make it easy for installation, for example, when drilled holes in the utility pole or other structure are off by a small distance.

Figure 3A:
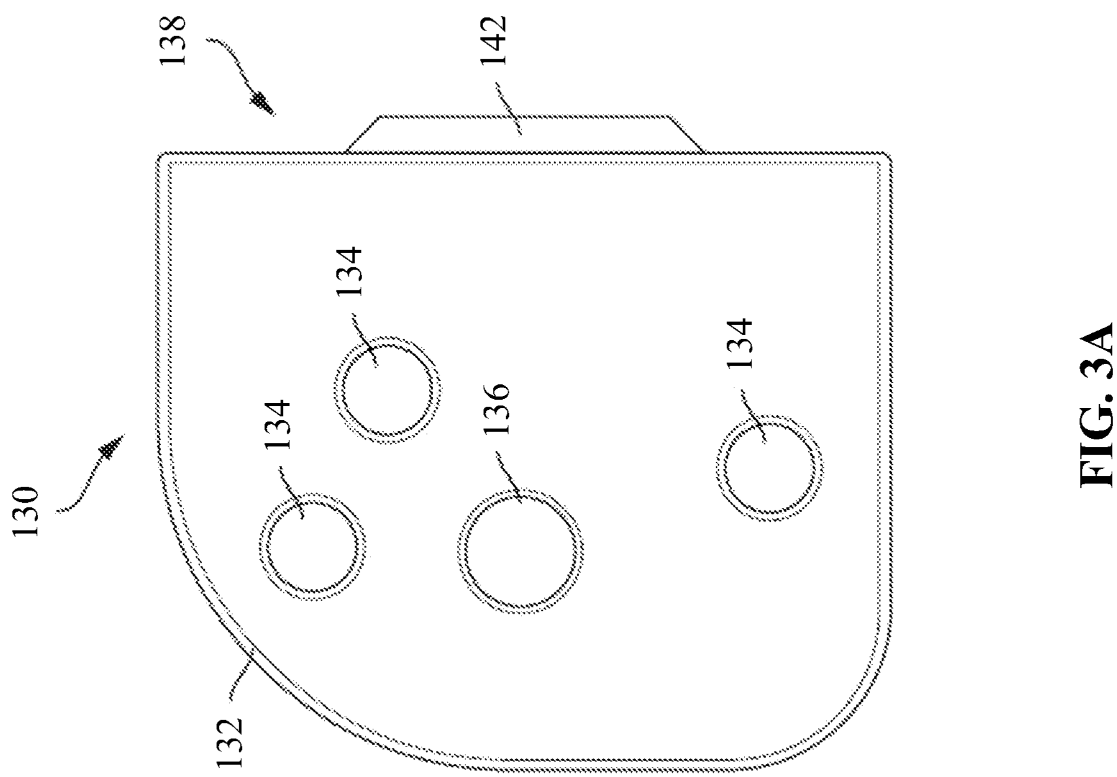
FIGS. 3A-C depict an example pivoting component of a gain base configured to enable attachment of an insulator to a utility pole at varying angles, according to one or more aspects described herein.
Figure 3B:
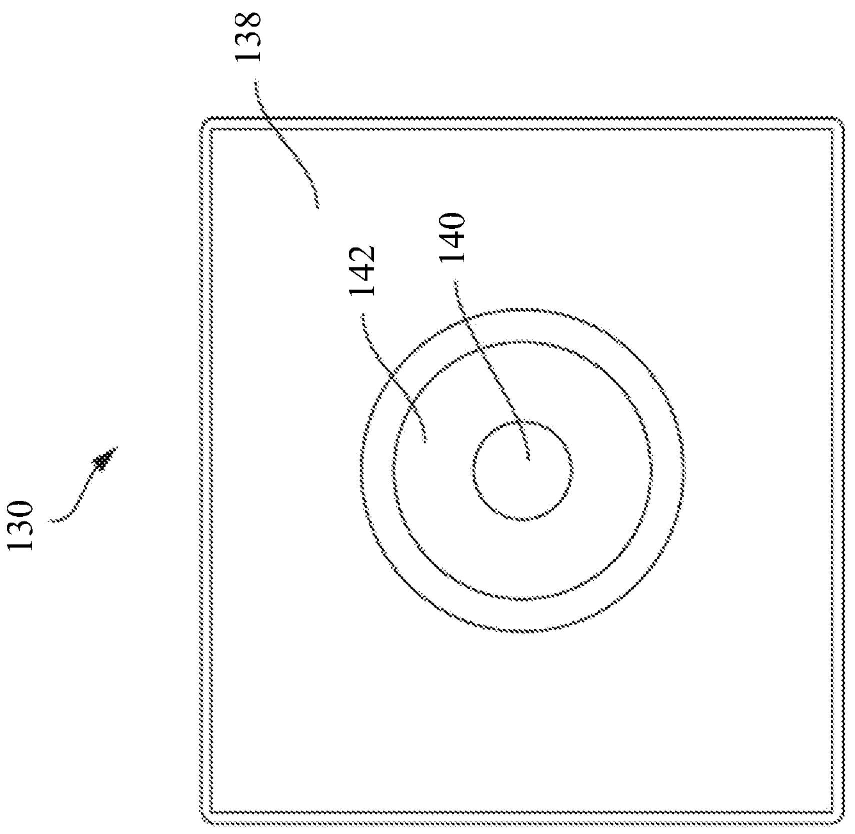
Figure 3C:
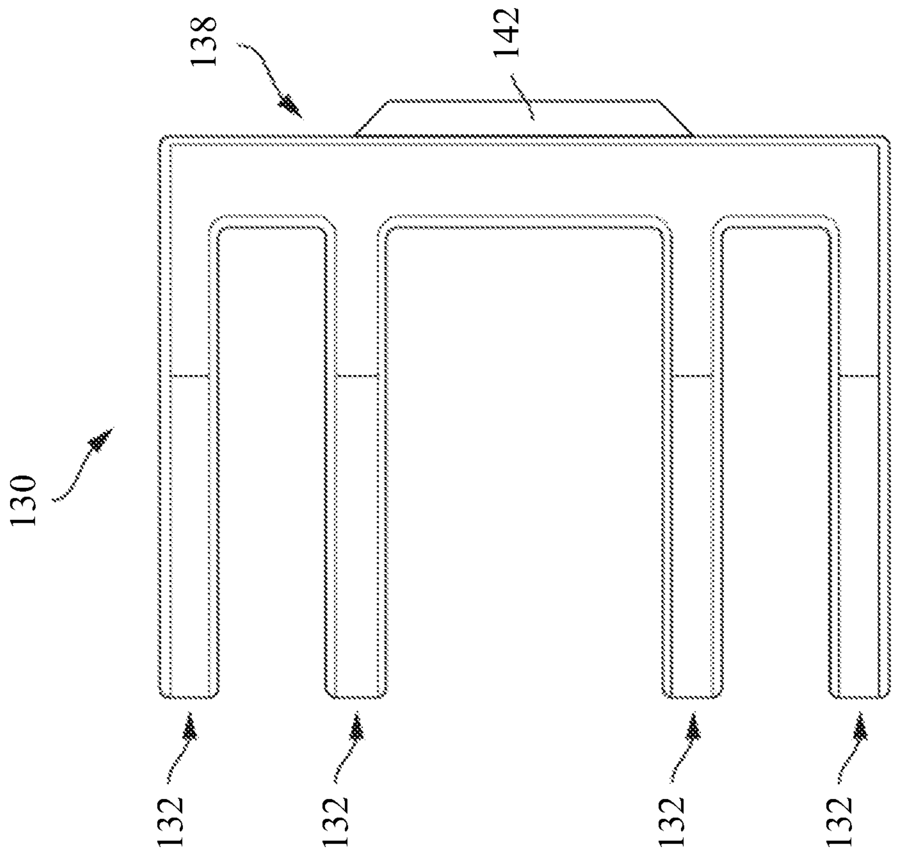

FIGS. 3A-C depict various view of pivoting component 130 of gain base 100, according to one or more aspects described herein. For example, FIG. 3A depicts a side view of pivoting component 130, FIG. 3B depicts a front view of pivoting component 130, and FIG. 3C depicts a top view of pivoting component 130. In various embodiments, pivoting component 130 may comprise a set of arms 132 extending from front face 138. In various embodiments, the set of arms 132 may comprise four arms, as depicted in FIG. 3C. In other embodiments, however, a different number of arms my be included on pivoting component 130 while remaining consistent with the spirit of this disclosure. Each arm 132 may include one or more holes 134 and a hole 136. In various embodiments, the one or more holes 134 may have the same or a substantially similar diameter as the one or more holes 114 on curved arms 112 of fixed component 110. In cooperation with one or more holes 114, one or more holes 134 may be used to select the angle at which an insulator is mounted to a utility pole or other structure via gain base 100. In various embodiments, hole 136 may have the same or a substantially similar diameter as hole 116 on curved arms 112 of fixed component 110. In cooperation with hole 116, hole 136 may be used to create a pivot point on around which pivoting component 130 may be rotated with respect to fixed component 110. In various embodiments, pivoting component 130 may include a front mounting hole 140 via which an insulator may be affixed to gain base 100 at an angle determined based on the position of pivoting component 130 relative to fixed component 110. Front hole 140 may have a diameter large enough to accommodate a threaded insulator pin or other connection device configured to clamp or otherwise affix an insulator to gain base 100. In some embodiments, front hole 140 may be positioned on a step 142 configured to ensure an insulator is properly in contact with front face 138 with the load evenly distributed. In various embodiments, the gap between each internal arm 132 and the closest external arm 132 is wide enough to receive a curved arm 112 of fixed component 110. For example, the gap between each internal arm 132 and the closest external arm 132 is substantially similar to but slightly larger than the thickness of curved arms 112 to fit a curved arm 112 between internal arm 132 and external arm 132.

Figure 4A:
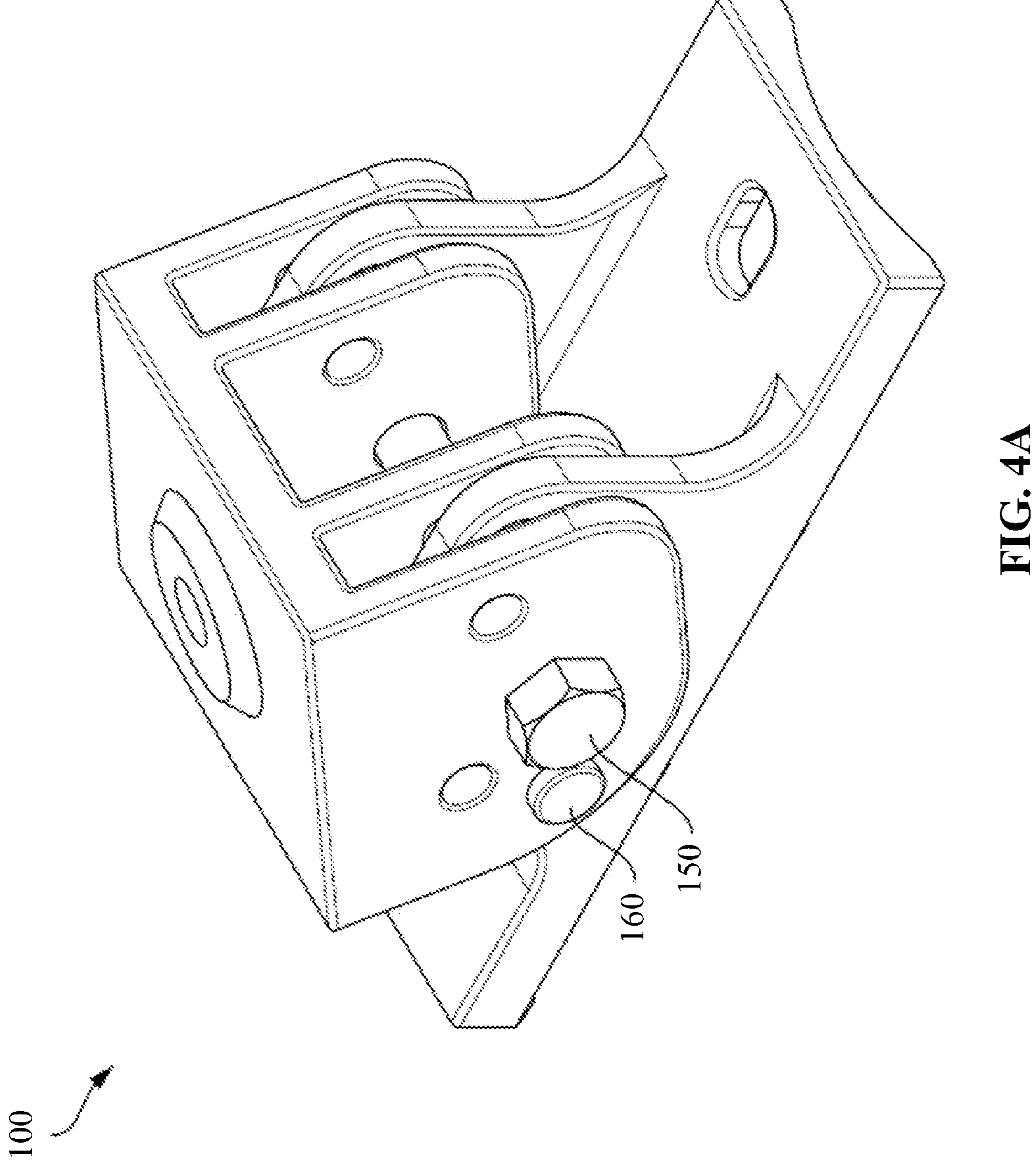
FIG. 4A depicts a front perspective view of an example gain base configured to enable attachment of an insulator to a utility pole at varying angles, according to one or more aspects described herein.
Figure 4B:
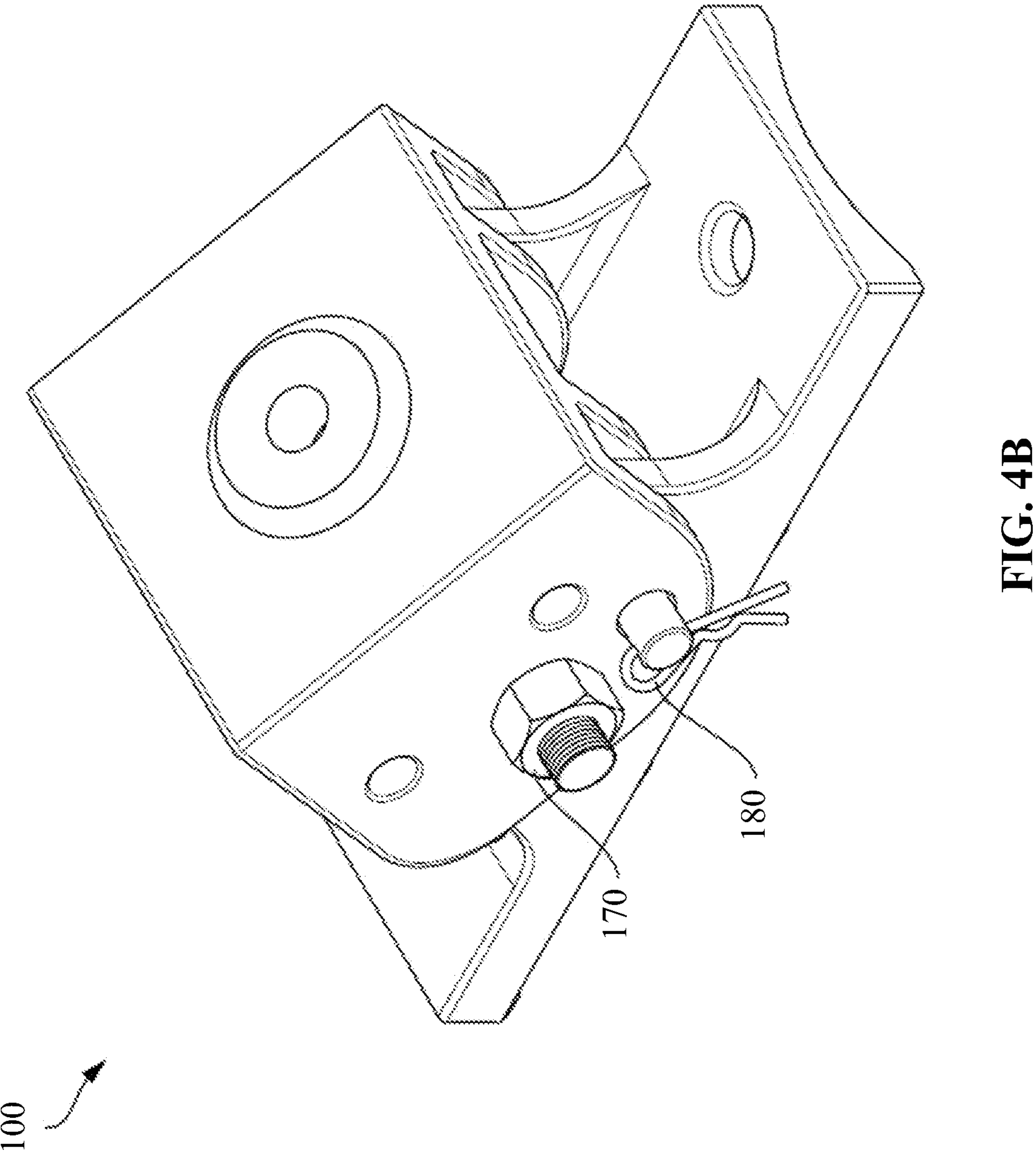
FIG. 4B depicts a rear perspective view of an example gain base configured to enable attachment of an insulator to a utility pole at varying angles, according to one or more aspects described herein.

FIGS. 4A-B depict various perspective views of gain base 100 in which pivoting component 130 is affixed to fixed component 110, according to one or more aspects described herein. For example, FIG. 4A depicts a front perspective view of gain base 100, and FIG. 4B depicts a rear perspective view of gain base 100. In various embodiments, when hole 136 in each arm 132 of pivoting component 130 is aligned with hole 116 in each curved arm 112 of fixed component 110, the holes 116 and holes 136 are configured to receive a threaded bolt 150. Threaded bolt 150 is configured to act as a pivot pin around which pivoting component 130 rotates with respect fixed component 110. In other words, the location of threaded bolt 150 may comprise a pivot point around which pivoting component 130 rotates. For example, in some embodiments, pivoting component 130 may be configured to rotate around threaded bolt 150 up to 90 degrees with respect to fixed component 110. In various embodiments, threaded bolt 150 may be secured using a nut 170 applied to threaded bolt 150 on a side of pivoting component 130 opposite a side into which threaded bolt 150 is inserted into a hole 136. In various embodiments, pivoting component 130 may be locked in (or otherwise secured) at a specific angle with respect to fixed component 110 using a clevis pin 160. For example, in various embodiments, a clevis pin 160 may inserted through at least one of the one or more holes 134 in each arm 132 of pivoting component 130 and at least one of the one or more holes 114 of each curved arm 112 of fixed component 110. The angle at which pivoting component 130 is affixed relative to fixed component 110 may be selected by aligning one of one or more holes 134 with one of one or more holes 114. For example, pivoting component 130 may be set at plurality of potential angles by aligning the individual holes of the one or more holes 134 with individual holes of the one or more holes 114. In various embodiments, clevis pin 160 may be secured using a cotter pin 180 applied to clevis pin 160 on a side of pivoting component 130 opposite a side into which clevis pin 160 is inserted into a hole 134. Cotter pin 180 may be configured to prevent clevis pin 160 from moving in lateral directions. In various embodiments, threaded bolt 150 and clevis pin 160 may each comprise one or more other types of elongated components configured to pass through the respective holes described herein, including bolts, screws, pins, rods, and/or other similar components. In various embodiments, threaded bolt 150 and clevis pin 160 may be secured using one or more other techniques not described herein but otherwise known in the art.

FIGS. 5-8 and FIGS. 9A-C depict alternative embodiments of a gain base configured to enable attachment of an insulator to a utility pole at multiple angles, according to one or more aspects described herein.

Figure 5:
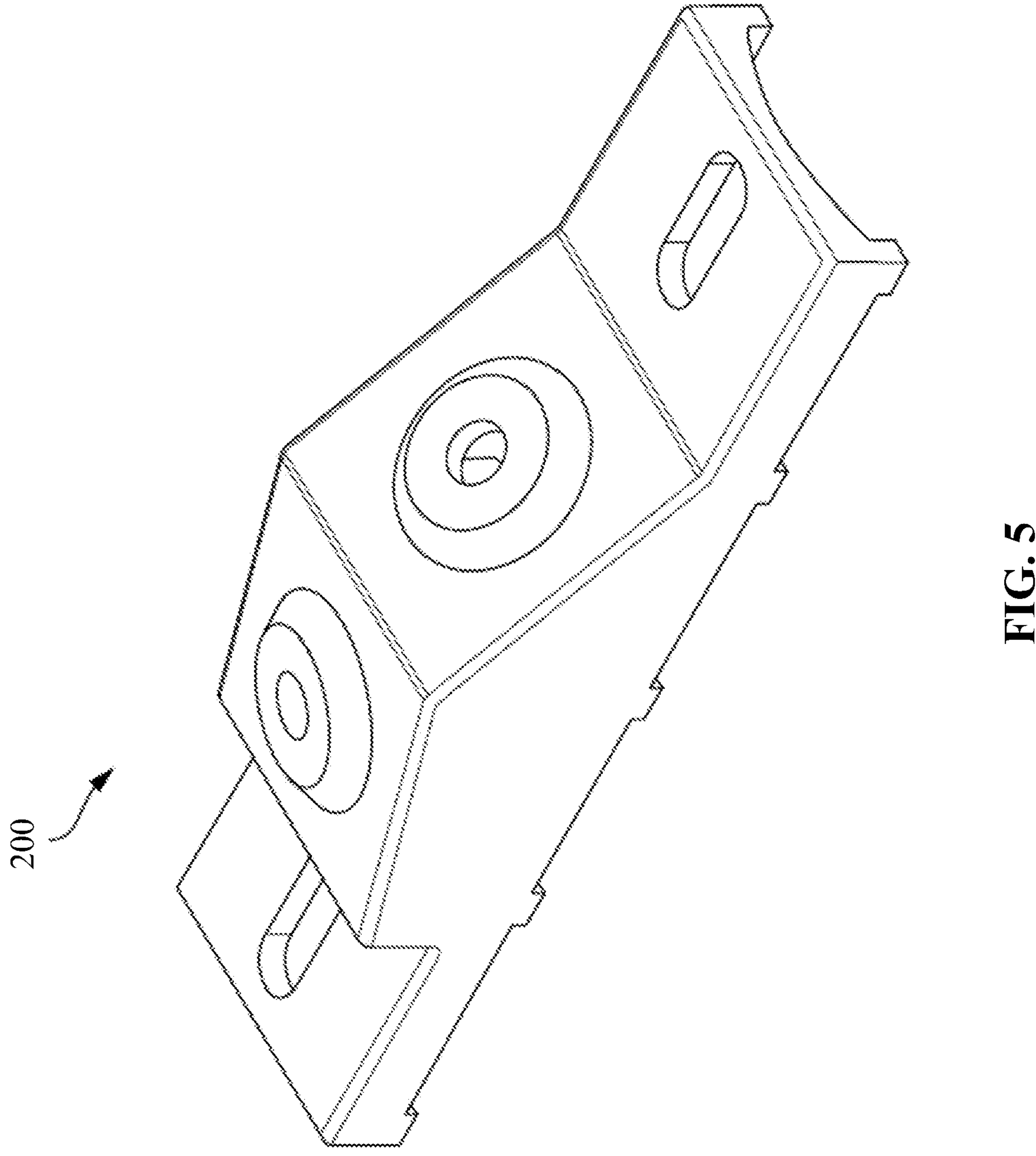
FIG. 5 depicts an example gain base configured to enable attachment of an insulator to a utility pole at two possible angles, according to one or more aspects described herein.

FIG. 5 depicts a gain base 200 configured to enable attachment of an insulator to a utility pole at two possible angles, according to one or more aspects described herein. For example, instead of a pivoting component which may be adjusted relative to a fixed component to select an angle at which an insulator is affixed, gain base 200 may instead include two front holes included as part of a fixed component, each front hole corresponding to a different angle at which an insulator may be affixed to a utility pole or other structure using gain base 200.

Figure 6:
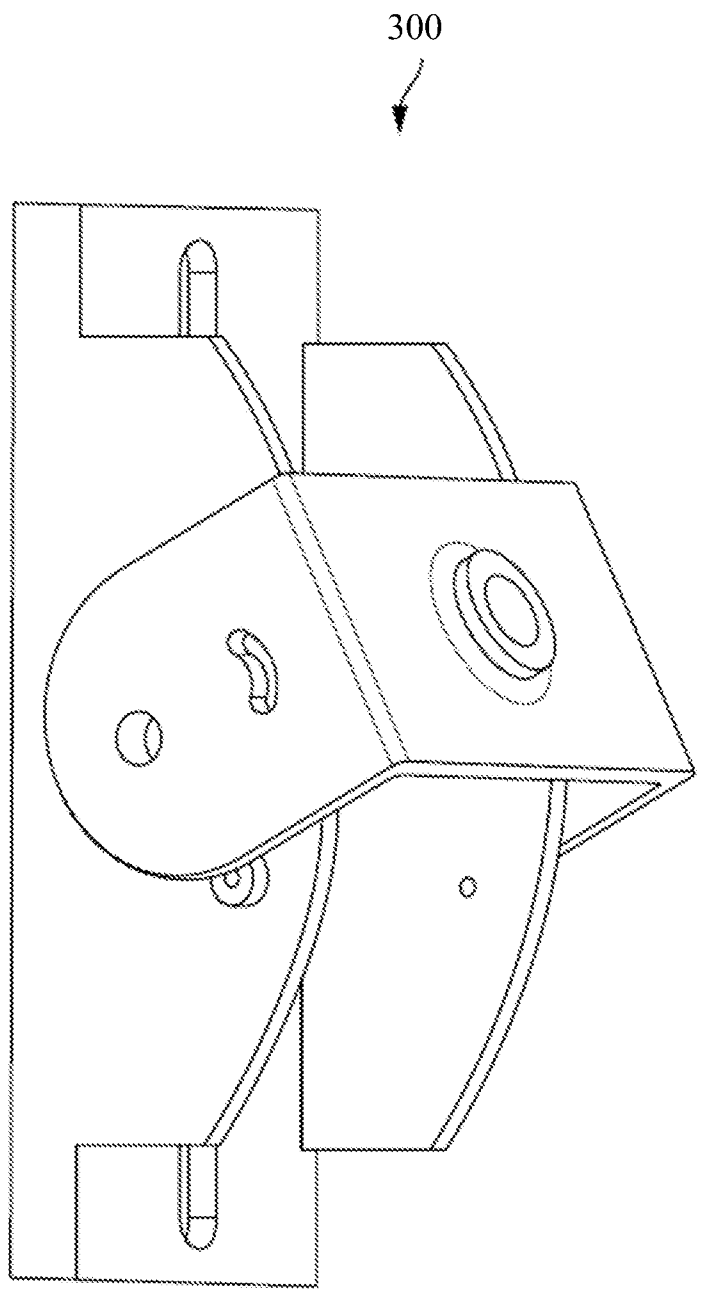
FIG. 6 depicts an example gain base configured to enable attachment of an insulator to a utility pole at varying angles selected using a ratchet style, according to one or more aspects described herein.

FIG. 6 depicts a gain base 300 configured to enable attachment of an insulator to a utility pole at varying angles selected using a ratchet style, according to one or more aspects described herein. In some embodiments, gain base 300 may allow an insulator to be mounted at any angle ranging from 0-90 degrees relative to a utility pole or other structure to which gain base 300 is attached.

Figure 7:
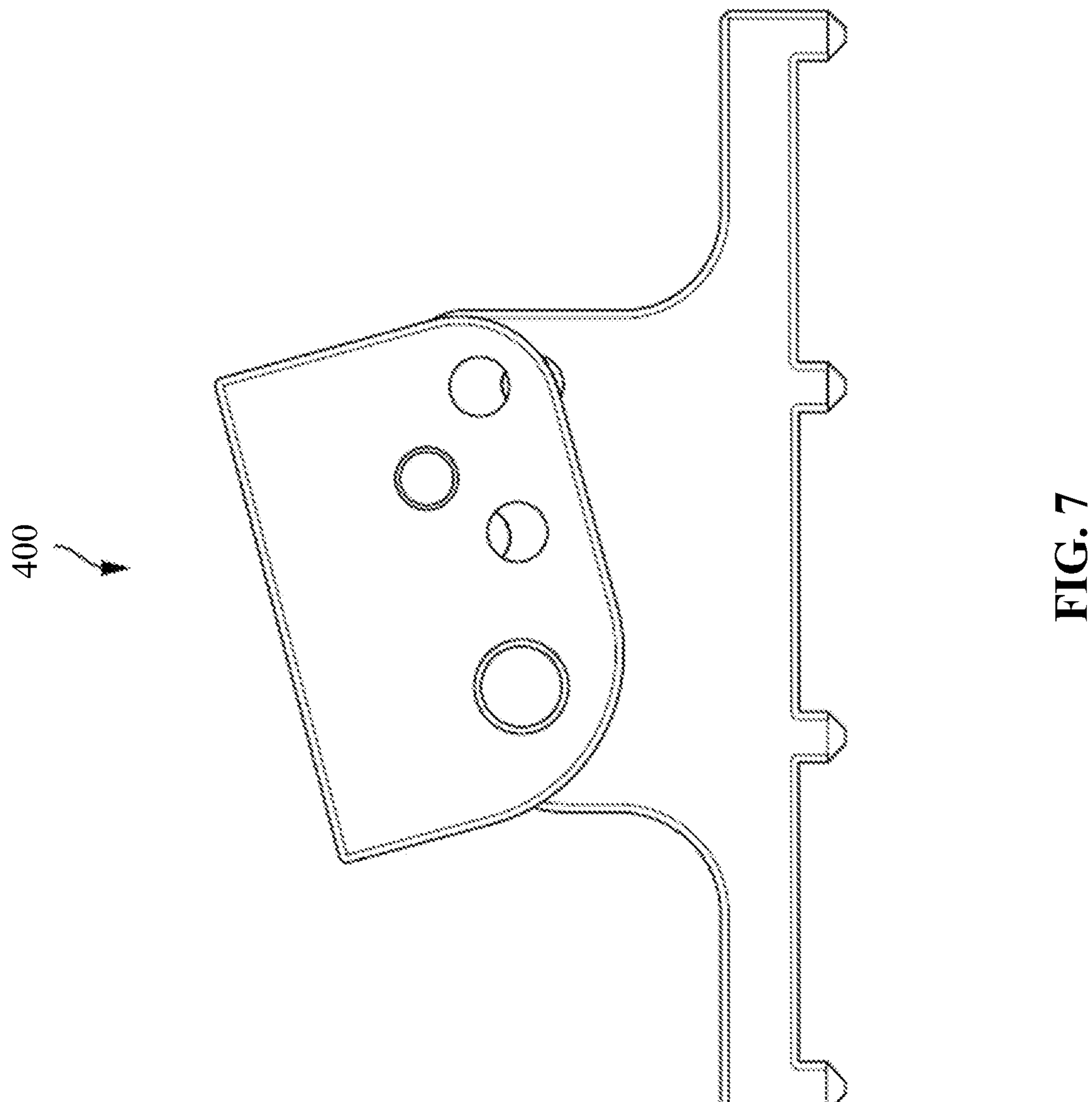
FIG. 7 depicts an example gain base configured to enable attachment of an insulator to a utility pole at three possible angles selected using a ratchet style, according to one or more aspects described herein.

FIG. 7 depicts a gain base 400 configured to enable attachment of an insulator to a utility pole at three possible angles selected using a ratchet style, according to one or more aspects described herein. As the angle is selected using a ratchet style, gain base 400 is similar to gain base 300 depicted in FIG. 6. However, gain base 400 may be restricted as to which angles may be selected. For example, using gain base 400, only three possible angles may be selected (e.g., 5, 15, and 30 degrees). In certain applications, these angles are the most commonly used angles for mounting insulators onto a utility pole. In various embodiments, a pivoting component of gain base 400 may include at least four holes. One of the four holes may be used as a pivot point in a manner similar to that described herein with respect to hole 116 and hole 136. The other three holes may be used to select an angle at which gain base 400 is set. In some embodiments, gain base 400 may be designed to allow for one or more other angles to be used.

Figure 8:
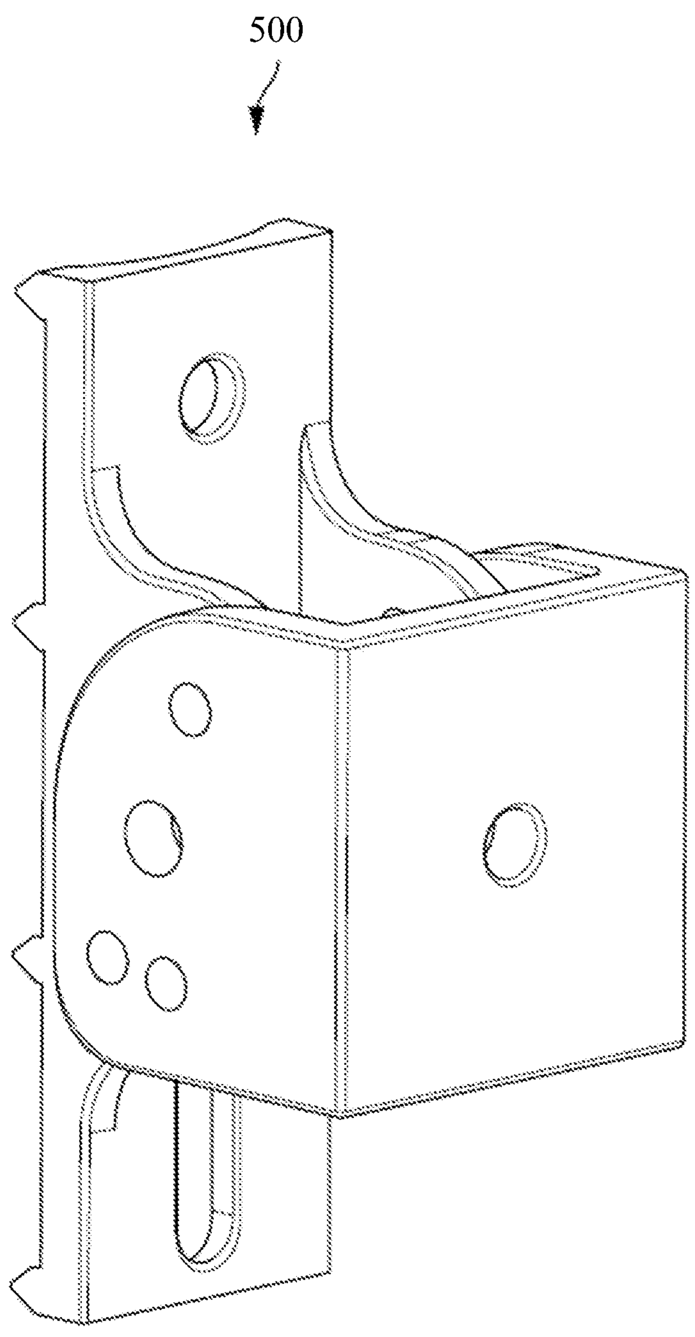
FIG. 8 depicts a perspective view of an example gain base comprising a pivoting component having single ribs, according to one or more aspects described herein.

FIG. 8 depicts a perspective view of a gain base 500 comprising a pivoting component having single ribs, according to one or more aspects described herein. For example, rather than a set of four arms, the pivoting component of gain base 500 may instead have a set of two arms that fit on either side of curved arms of a fixed component. Gain base 100 may be preferable to gain base 500, however, because the pivoting pin (e.g., threaded bolt 150) and selecting pin (e.g., clevis pin 160) are in double shear instead of single shear to reduce stress on the pins.

Figure 9A:
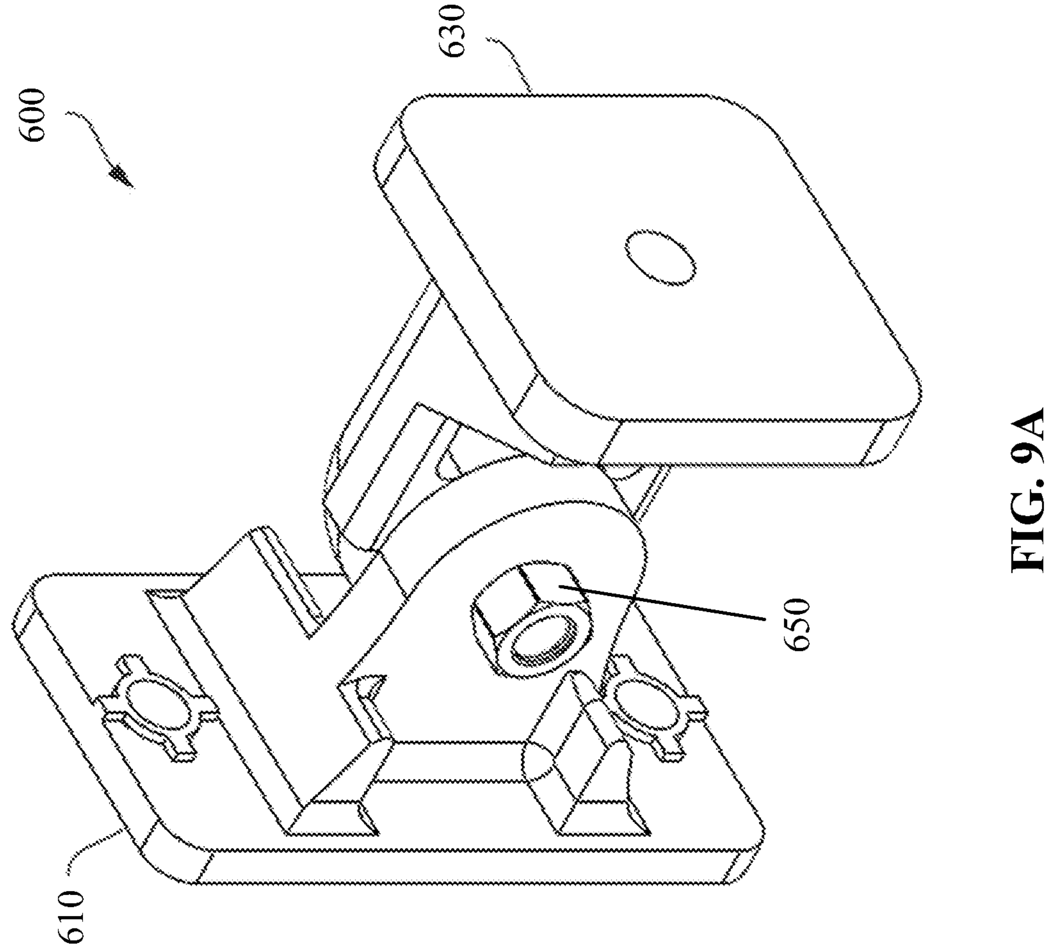
FIGS. 9A-C depict various views of an example gain base configured to enable attachment of an insulator to a utility pole at multiple angles using a set of interlocking teeth, according to one or more aspects described herein.
Figure 9C:
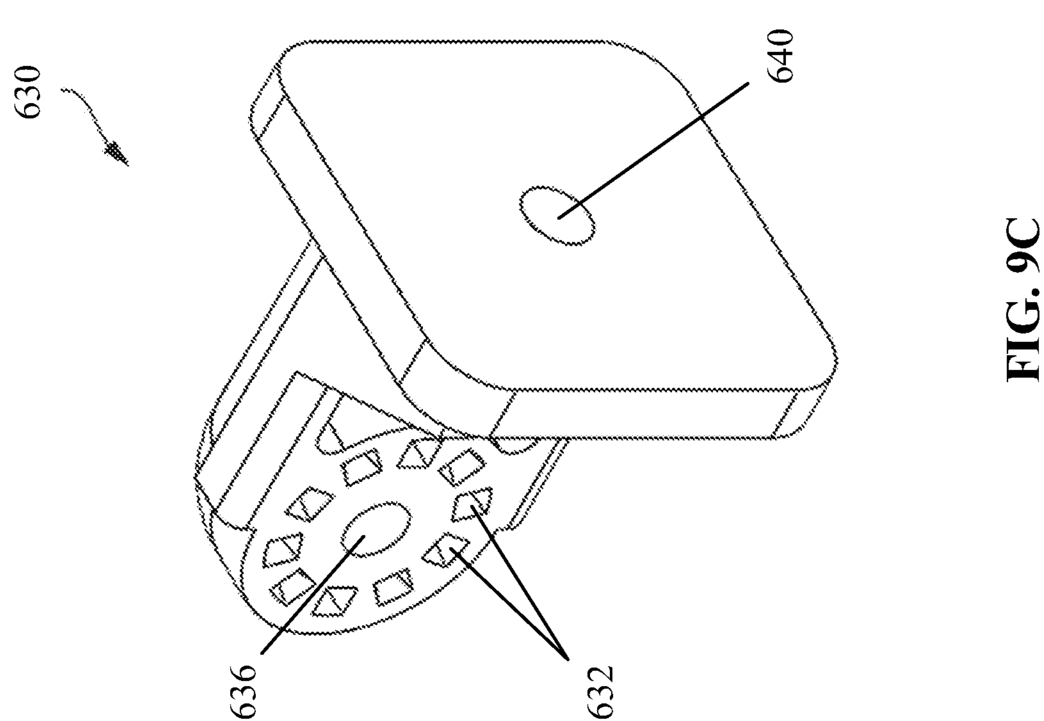
Figure 9B:
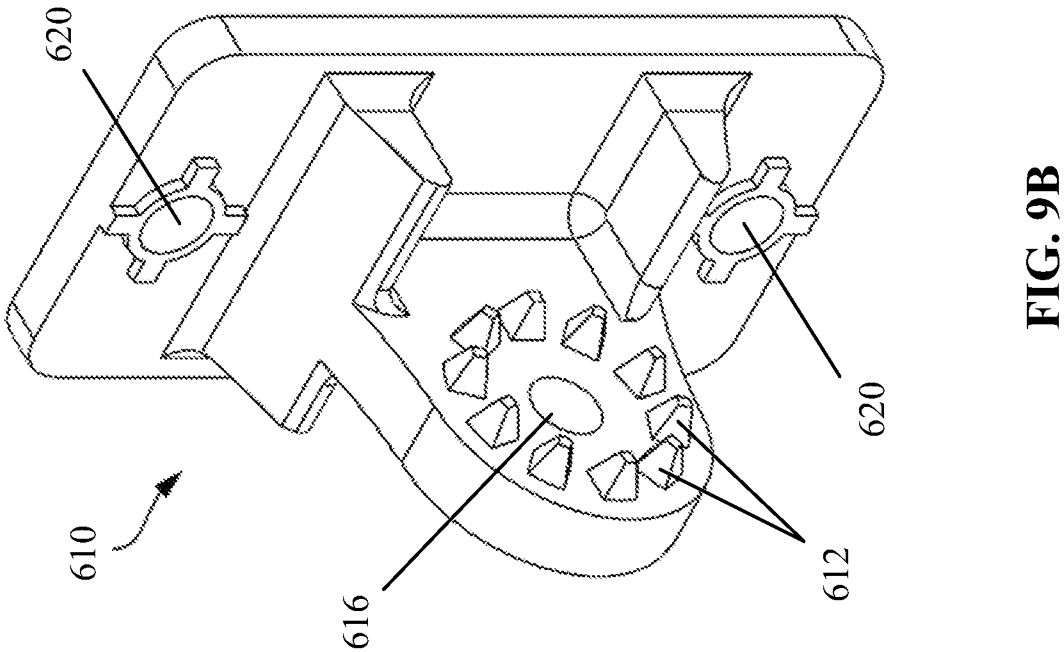

FIGS. 9A-C depict a gain base 600 configured to enable attachment of an insulator to a utility pole at multiple angles using a set of interlocking teeth, according to one or more aspects described herein. In various embodiments, gain base 600 comprises a fixed component 610, a pivoting component 630, and/or one or more other components. For example, FIG. 9A depicts a perspective view of gain base 600 having at least a fixed component 610 and a pivoting component 630, FIG. 9B depicts a perspective view of fixed component 610, and FIG. 9C depicts a perspective view of pivoting component 630. As depicted in FIG. 9A, fixed component 610 and pivoting component 630 may be secured together using a bolt 650. As depicted in FIG. 9B, fixed component 610 may comprise a set of teeth 612, a hole 616, one or more holes 620, and/or one or more other components. As depicted in FIG. 9C, pivoting component 630 may comprise a set of grooves 632, a hole 636, a mounting hole 640, and/or one or more other components.

In various embodiments, fixed component 610 may be configured to be affixed to a structure. For example, fixed component 610 may be configured to be removably affixed to a utility pole or other structure. In various embodiments, fixed component 610 may be affixed to a utility pole or other structure via one or more holes 620. For example, one or more holes 620 may be configured to receive a bolt, screw, and/or other component configured to affix fixed component 610 to a utility pole or other structure. In some embodiments, one or more holes 620 may include at least two holes with one or more holes larger than others to make it easy for installation, for example, when drilled holes in the utility pole or other structure are off by a small distance.

In various embodiments, fixed component 610 may include an elongated portion extending from a side of fixed component 610 opposite a side of fixed component 610 configured to be affixed to a structure. In various embodiments, the set of one or more teeth 612 extend from a side of the elongated portion perpendicular to a side of fixed component 610 configured to be affixed to a structure. In various embodiments, the set of teeth 612 of fixed component 610 may be configured to interface with pivoting component 630. In various embodiments, the set of teeth 612 may be arranged in a circular pattern. For example, in some embodiments, the set of teeth 612 may be arranged in a circular pattern around hole 616. In various embodiments, the set of teeth 612 may be configured to provide grip and stability when pivoting component 630 is secured to fixed component 610 and the angle is set, as described further herein.

In various embodiments, an insulator may be affixed to gain base 600 via mounting hole 640 at an angle determined based on the position of pivoting component 630 relative to fixed component 610. Accordingly, mounting hole 640 of pivoting component 630 may have a diameter large enough to accommodate a threaded insulator pin or other connection device configured to clamp or otherwise affix an insulator to gain base 600. In various embodiments, pivoting component 630 may include an elongated portion extending from a side of pivoting component 630 opposite a side of pivoting component 630 to which an insulator is to be attached (i.e., the side of pivoting component 630 having mounting hole 640). In various embodiments, the set of one or more grooves 630 may be positioned on (and extend within) a side of the elongated portion perpendicular to a side of pivoting component 630 to which an insulator is to be attached. In various embodiments, the set of grooves 632 of pivoting component 630 may be configured to interface with fixed component 610. For example, the set of grooves 632 may be configured to receive the set of teeth 612. In various embodiments, the set of grooves 632 may be arranged in a circular pattern. For example, in some embodiments, the set of grooves 632 may be arranged in a circular pattern around hole 636. In other embodiments, both the set of teeth 612 and the set of grooves 632 may be arranged in a different pattern or configuration, so long as the set of teeth 612 correspond with and are configured to interface with the set of grooves 632 (and vice versa). In various embodiments, the set of grooves 632 of pivoting component 630 (together with the set of teeth of fixed component 610) are used to select the angle at which an insulator is attached to a utility pole or other structure using gain base 600.

In various embodiments, when hole 636 of pivoting component 630 is aligned with hole 616 of fixed component 610, the holes 616 and holes 616 are configured to receive a bolt 650. In various embodiments, bolt 650 is configured to secure pivoting component 630 to fixed component 610. In some embodiments, bolt 650 may be configured to act as a pivot pin around which pivoting component 630 rotates with respect fixed component 610. In other words, the location of bolt 150 may comprise a pivot point around which pivoting component 630 rotates. In various embodiments, bolt 650 may be secured using a nut applied to bolt 650 on a side of pivoting component 630 opposite a side into which bolt 650 is inserted into a hole 636. In various embodiments, bolt 650 may comprise one or more other types of elongated components configured to pass through the respective holes described herein, including bolts, screws, pins, rods, and/or other similar components. In various embodiments, bolt 650 may be secured using one or more other techniques not described herein but otherwise known in the art.

In various embodiments, the set of grooves 632 of pivoting component 630 are used to select the angle at which the insulator is mounted to the utility pole or other structure by adjusting the manner in which set of grooves 632 align with the set of teeth 612 of fixed component 610. For example, the pivoting component 630 can be rotated to different angles with the set of grooves 632 still being able to receive the set of teeth 612 given their corresponding circular (or, in some alternative embodiments, semi-circular) shapes. To secure pivoting component 630 to fixed component 610, bolt 650 may simply be tightened once the set of grooves 632 are aligned with the set of teeth 612 at a desired angle. Once secured, the angle of pivoting component 630 with respect to fixed component 610 may be adjusted by simply loosening bolt 650 and rotating pivoting component 630 to the desired angle. In some embodiments, the angle of pivoting component 630 with respect to fixed component 610 may be adjusted without removing entirely bolt 650 from hole 616 and 630. For example, in some embodiments, bolt 650 may be loosened simply to enable set of teeth 612 to be disengaged from set of grooves 632 (e.g., by creating a displacement between pivoting component 630 and fixed component 610 longer than the length of the set of teeth 612), and pivoting component 630 may then be freely rotated to the desired angle (e.g., about bolt 650) and secured in place by retightening bolt 650.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. An apparatus to facilitate attachment of an insulator to a structure at multiple angles in power distribution system, the apparatus comprising:

a fixed component configured to be affixed to a structure, the fixed component including a first set of arms comprising two arms; and a pivoting component configured to rotate with respect to the fixed component to adjust the orientation of a mounting hole via which an insulator is attached to the apparatus, wherein the pivoting component includes a second set of arms comprising at least two arms.

2. The apparatus of claim 1, wherein the first set of arms and the second set of arms each include a curved edge to allow the pivoting component to rotate with respect to the fixed component along the curved edges of the first set of arms.

3. The apparatus of claim 1, wherein the first set of arms each have a first set of one or more holes and a second hole, and wherein the second set of arms each have a third set of one or more holes and a fourth hole.

4. The apparatus of claim 3, wherein at least one hole from among the first set of one or more holes and the second hole is defined by a chamfered edge extending away from a side of one of the first set of arms.

5. The apparatus of claim 3, wherein each of the first set of one or more holes and each of the third set of one or more holes have substantially the same diameter, and wherein each of the second hole and the fourth hole have substantially the same diameter.

6. The apparatus of claim 3, wherein each of the first set of one or more holes and each of the third set of one or more holes have a first diameter, and each of the second hole and the fourth hole have a second diameter, wherein the first diameter is different than the second diameter.

7. The apparatus of claim 3, wherein when the second hole of each of the first set of arms and the fourth hole of each of the second set of arms are aligned, the second hole of each of the first set of arms and the fourth hole of each of the second set of arms are together configured to receive a bolt, wherein the bolt defines a pivoting point about which the pivoting component is configured to rotate with respect to the fixed component.

8. The apparatus of claim 3, wherein when at least one of the first set of one or more holes of each of the first set of arms and at least one of the third set of one or more holes of the second set of arms are aligned, the at least one of the first set of one or more holes of each of the first set of arms and the at least one of the third set of one or more holes of the second set of arms are together configured to receive a pin, wherein the pivoting component is secured at an angle with respect to the fixed component via the pin.

9. The apparatus of claim 8, wherein the pin comprises a clevis pin, wherein the clevis pin is secured within the at least one of the first set of one or more holes of each of the first set of arms and the at least one of the third set of one or more holes of the second set of arms via a cotter pin.

10. The apparatus of claim 8, wherein the third set of one or more holes includes at least two holes, and wherein each of the third set of one or more holes corresponds to a predefined angle at which the insulator is attached to the structure via the apparatus.

11. The apparatus of claim 1, wherein the fixed component includes teeth extending from a side of the fixed component opposite a side of the fixed component from which the first set of arms extend, wherein the teeth are configured to interface with a surface of the structure to more rigidly secure the fixed component to the structure.

12. The apparatus of claim 1, wherein the mounting hole is configured to receive a threaded insulator pin.

13. The apparatus of claim 1, wherein a gap between an interior side of an outermost arm of the second set of arms on one side of the pivoting component and an interior side of an outermost arm of the second set of arms on the opposite side of the pivoting component is at least as wide as a width of the first set of arms.

14. The apparatus of claim 13, wherein the second set of arms includes four arms, the four arms comprising two external arms and two internal arms, wherein a gap between an interior side of one of the two arms of the first set of arms and an interior side of a remaining one of the two arms of the first set of arms is at least as wide as a width of the two internal arms of the second set of arms.

* * * * *